United States Patent
Komaki et al.

(10) Patent No.: US 7,166,334 B2
(45) Date of Patent: Jan. 23, 2007

(54) METHOD OF MANUFACTURING DISC-SHAPED RECORDING MEDIUM

(75) Inventors: Tsuyoshi Komaki, Chuo-Ku (JP); Shigeru Yamatsu, Tokyo (JP)

(73) Assignee: TDK Corporation, Tokyo (JP)

( * ) Notice: Subject to any disclaimer, the term of this patent is extended or adjusted under 35 U.S.C. 154(b) by 271 days.

(21) Appl. No.: 10/929,637

(22) Filed: Aug. 30, 2004

(65) Prior Publication Data
US 2005/0048202 A1 Mar. 3, 2005

(30) Foreign Application Priority Data
Sep. 1, 2003 (JP) .............................. 2003-308228

(51) Int. Cl.
*B05D 3/06* (2006.01)
*B05D 3/12* (2006.01)
(52) U.S. Cl. .................... 427/554; 427/240; 427/289; 118/35
(58) Field of Classification Search ................ 427/240, 427/289, 487, 554, 355, 356; 118/52, 35, 118/639
See application file for complete search history.

(56) References Cited
FOREIGN PATENT DOCUMENTS
JP 2002-197731 A1 7/2002

OTHER PUBLICATIONS
Patent Abstracts of Japan, vol. 2002, No. 11, Nov. 6, 2002, JP 2002-197731.

*Primary Examiner*—Bret Chen
*Assistant Examiner*—Cachet I. Sellman
(74) *Attorney, Agent, or Firm*—Darby & Darby

(57) ABSTRACT

Disclosed is a disc-shaped recording medium manufacturing method capable of making it difficult to leave the cutting wastage produced upon forming a notch for exfoliating a stamper on a disc-shaped substrate in the case of adopting a stamper-based transfer method, and surely forming the notch to improve a manufacturing yield. This disc-shaped recording medium manufacturing method is that a spacer layer having recording faces on both surfaces thereof is formed between the disc-shaped substrate and the stamper, a notch is formed in the vicinity of an outer peripheral edge of the stamper by a rotary blade of a circle cutter, and the stamper is exfoliated through the notch while the spacer layer stays on the disc-shaped substrate.

5 Claims, 5 Drawing Sheets

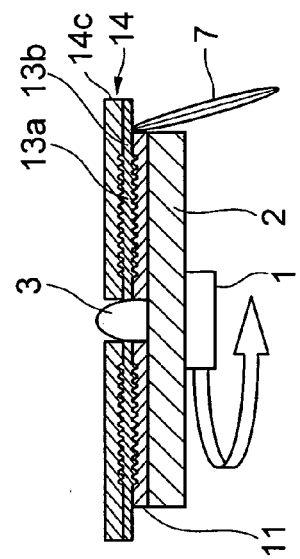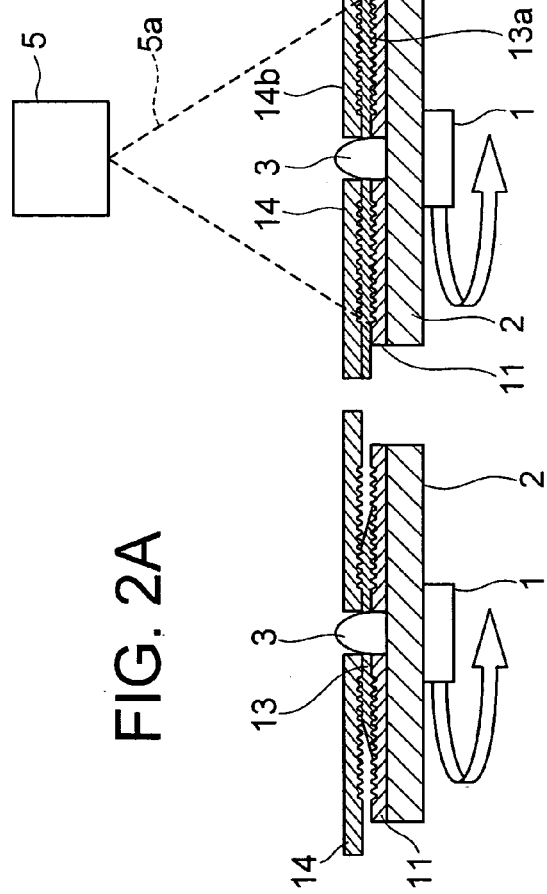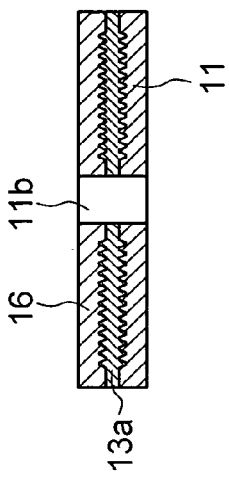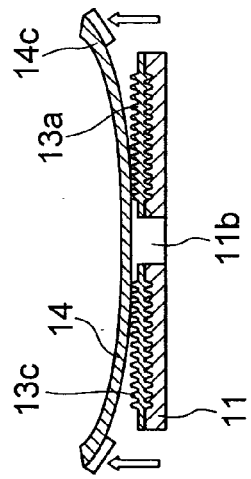

METHOD OF MANUFACTURING DISC-SHAPED RECORDING MEDIUM

This application claims priority under 35 U.S.C. §119 of Japanese Patent Application No. 2003-308228 filed Sep. 1, 2003, which is incorporated by reference herein.

BACKGROUND OF THE INVENTION

1. Field of the Invention

The present invention relates to a method of manufacturing a disc-shaped recording medium including a plurality of recording faces.

2. Description of the Prior Art

The manufacture of, e.g., a single-sided 2-layered type Blu-ray Disc capable of recording with a higher density than a DVD requires a spacer layer onto which recording faces are transferred. In processes of manufacturing this type of optical disc, however, as shown in FIG. 8, in the case of adopting a 2P transfer method for forming a spacer layer 102 between a disc-shaped substrate 101 and a stamper 103, it is required that the stamper 103 be exfoliated after forming the spacer layer 102. The stamper 103 has hitherto been exfoliated after forming a notch between the stamper 103 and the spacer layer 102 by use of a cutter knife 100.

When notched by the cutter knife 100, however, cutting wastage is accumulated and easily left at a tip of the cutter knife 100. This cutting wastage is adhered to the disc-shaped substrate 101 by static electricity generated when exfoliating the stamper 103. The cutting wastage, if left as it is, becomes a defect of the optical disc and therefore needs to be removed. This is time-consuming and leads to an increase in manufacturing costs. Further, the cutter knife is fixed and is therefore incapable of following up with a surface deflection and eccentricity of the disc-shaped substrate, and it often happens that completely-notched portions and incompletely-notched portions are formed. These incompletely-notched portions cause an occurrence of burrs after the exfoliation, which is a factor of decreasing a manufacturing yield of the optical disc.

Moreover, Japanese Patent Application Laid-Open Publication No.2002-197731 discloses an exfoliation method of partly exfoliating a portion between a disc substrate and a dummy disc that are bonded by a bonding agent, and exfoliating the dummy member from the disc substrate by supplying a compressed gas to between the disc substrate and the dummy member which have been partly exfoliated and expanded. This exfoliation method, however, requires equipment, a pipe arrangement, etc. for supplying the compressed gas.

SUMMARY OF THE INVENTION

It is an object of the present invention to provide a disc-shaped recording medium manufacturing method capable of making it difficult to leave the cutting wastage produced upon forming a notch for exfoliating a stamper, on a disc-shaped substrate in the case of adopting a stamper-based transfer process, and surely forming the notch to improve a manufacturing yield.

A disc-shaped recording medium manufacturing method, according to a first embodiment, of forming a recording layer on a disc-shaped substrate having a central hole, and forming another recording layer on the surface of a spacer layer on the recording layer with the spacer layer interposed therebetween, includes a step of applying an energy-ray curing resin for forming the spacer layer in the vicinity of the central hole, and thereafter disposing a light-transmittable stamper serving to form the another recording layer and having an outside diameter larger than the disc-shaped substrate so as to cover the disc-shaped substrate, a step of spreading the energy-ray curing resin over an entire surface of the disc-shaped substrate by rotating the disc-shaped substrate and the stamper, a step of curing the energy-ray curing resin by irradiating the energy-ray curing resin with energy rays through the light-transmittable stamper, and thus forming the spacer layer, a step of forming a notch in a boundary portion between the stamper and the disc-shaped substrate with a circle cutter from the side of the disc-shaped substrate, and a step of exfoliating the stamper.

According to the disc-shaped recording medium manufacturing method in the first embodiment, the circle cutter can form the notch in the boundary portion between the stamper and the disc-shaped substrate while making auto-rotations. Even in a case where the cutting wastage is produced when forming the notch, the cutting wastage is hard to be left on the disc-shaped substrate, and the notch can be surely formed. This enables an occurrence of burrs to be restrained, whereby a manufacturing yield can be improved. Moreover, since an outside diameter of the stamper is larger than the disc-shaped substrate, this facilitates the formation of the notch, and the stamper can be easily exfoliated by use of the protruded portion of the stamper.

In the disc-shaped recording medium manufacturing method according to the first embodiment, it is preferable that the circle cutter includes a rotary blade rotatably (auto-rotations) supported by a rotatable support portion and a grip member extending in a radial direction of the rotary blade from the rotatable support portion, and the grip member has an extensible/retractable mechanism extensible and retractable in its longitudinal directions. The rotary blade is pressed against the vicinity of the outer peripheral edge of the stamper when forming the notch, and, thereupon, the rotary blade moves in extensible/retractable directions as the grip member gets retracted and extended and is therefore capable of following up with a surface deflection and eccentricity of the disc-shaped substrate. As the notch can be surely formed, the occurrence of burrs after the exfoliation can be surely prevented.

A disc-shaped recording medium manufacturing method, according to a second embodiment, of forming a recording layer on a disc-shaped substrate having a central hole, and forming another recording layer on the surface of a spacer layer on the recording layer with the spacer layer interposed therebetween, includes a step of applying an energy-ray curing resin for forming the spacer layer in the vicinity of the central hole, and thereafter disposing a light-transmittable stamper serving to form the another recording layer so as to cover the disc-shaped substrate, a step of spreading the energy-ray curing resin over an entire surface of the disc-shaped substrate by rotating the disc-shaped substrate and the stamper, a step of curing the energy-ray curing resin by irradiating the energy-ray curing resin with energy rays through the light-transmittable stamper, and thus forming the spacer layer, a step of forming a notch by irradiating an outer peripheral edge of the stamper with a laser beam, and a step of exfoliating the stamper.

According to the disc-shaped recording medium manufacturing method in the second embodiment, the notch can be formed by irradiating the outer peripheral edge of the stamper with the laser beam. Hence, none of the cutting wastage occurs when forming the notch, and the notch can be surely formed without being affected by the surface deflection and the eccentricity of the disc-shaped substrate. It is also possible to improve the manufacturing yield by restraining the occurrence of the burrs.

In the disc-shaped recording medium manufacturing method according to the second embodiment, it is preferable the irradiation of the laser beam is effected by a laser output within 6 W through 26 W. If the laser output is less than 6 W, a depth of the notch becomes insufficient, and it is difficult to effect the exfoliation. Furthermore, if over 26 W, scorching occurs due to the heat, and the resin of the disc-shaped substrate is dissolved with the result that the burrs are easily produced. The laser can involve the use of, e.g., a $CO_2$ laser.

Furthermore, the stamper is constructed to have an outside diameter larger than the disc-shaped substrate, and the notch is formed by the irradiation of the laser beam in a circumferential direction in a boundary portion between a protruded portion of the stamper and the disc-shaped substrate. With this contrivance, the formation of the notch is facilitated, and the stamper can be easily exfoliated by use of the protruded portion of the stamper.

In the disc-shaped recording medium manufacturing method according to the second embodiment, the notch is formed while rotating the disc-shaped substrate, whereby the notch can be formed efficiently. In the case of the circle cutter, it is preferable that the cutter be pressed against the stamper so that the notch can be formed to a desired depth by making one rotation of the disc-shaped substrate. Further, in the case of the irradiation of the laser beam, it is preferable that the laser output be set so that the notch can be formed to the desired depth by making one rotation of the disc-shaped substrate. When the laser output is equal to or higher than 12 W, the notch can be formed to the desired depth by making one rotation, and hence it is more preferable that the laser output is within a range of 12 W through 26 W.

Furthermore, notching is effected so that the outer peripheral edge of the spacer layer is formed in a recessed shape with an inclination. With this contrivance, it is preferable that a swelling of the resin can be reduced when forming the light-transmittable layer on the spacer layer by spin coating after the exfoliation. Therefore, in the case of the circle cutter, it is preferable that the rotary blade abuts with an inclination to the surface of the disc-shaped substrate. Further, in the case of the irradiation of the laser beam, it is preferable that the irradiation of the laser beam is effected with an inclination to the surface of the disc-shaped substrate.

According to the disc-shaped recording medium manufacturing method in the second embodiment, in the case of adopting a stamper-based transfer method, cutting wastage produced when forming the notch for exfoliating the stamper is hard to be left on the disc-shaped substrate, the notch can be surely formed, and a manufacturing yield can be also improved.

BRIEF DESCRIPTION OF THE DRAWINGS

FIGS. 2A to 2E are side sectional views showing processes of manufacturing the 2-layered optical disc, which are executed subsequently to the process in FIG. 1C;

DETAILED DESCRIPTION OF THE PREFERRED EMBODIMENTS

First Embodiment

Figure 1A:
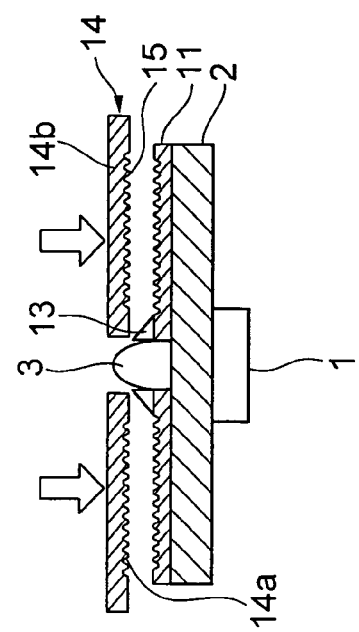
FIGS. 1A to 1C are side sectional views each showing a process of manufacturing a 2-layered optical disc in a first embodiment.
Figure 1B:
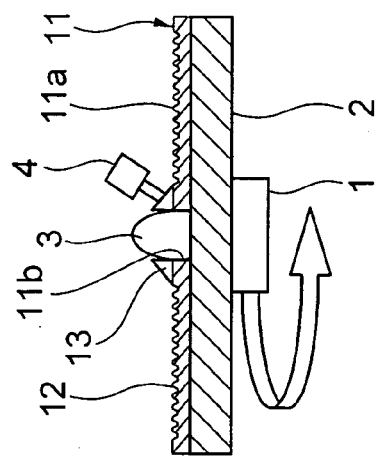
Figure 1C:
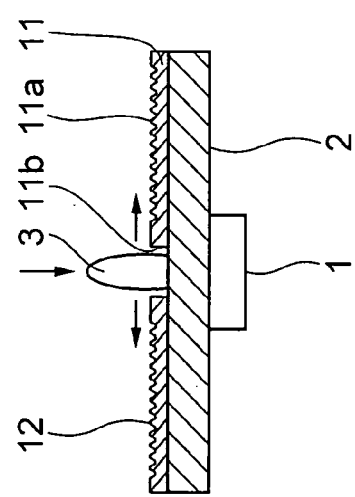
Figures 3A, 3B:
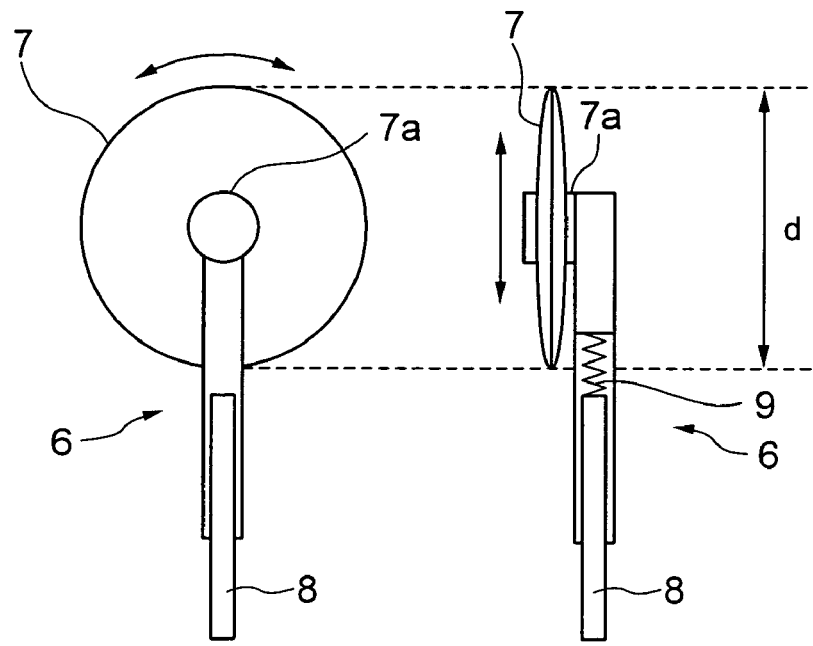
FIG. 3A is a front view of a circle cutter capable of executing a notch forming process in FIG. 2C.
FIG. 3B is a side view thereof.
Figure 4:
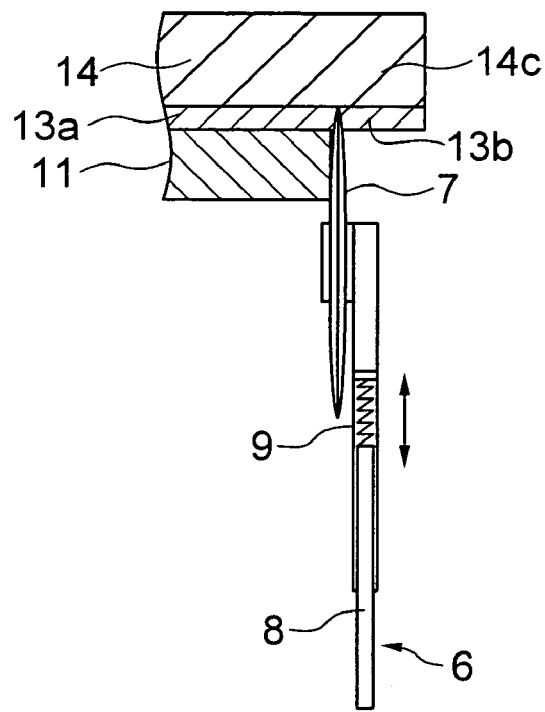
FIG. 4 is an enlarged principal side sectional view showing how the notch forming process in FIG. 2C is executed by the circle cutter in FIG. 3A.
Figure 5:
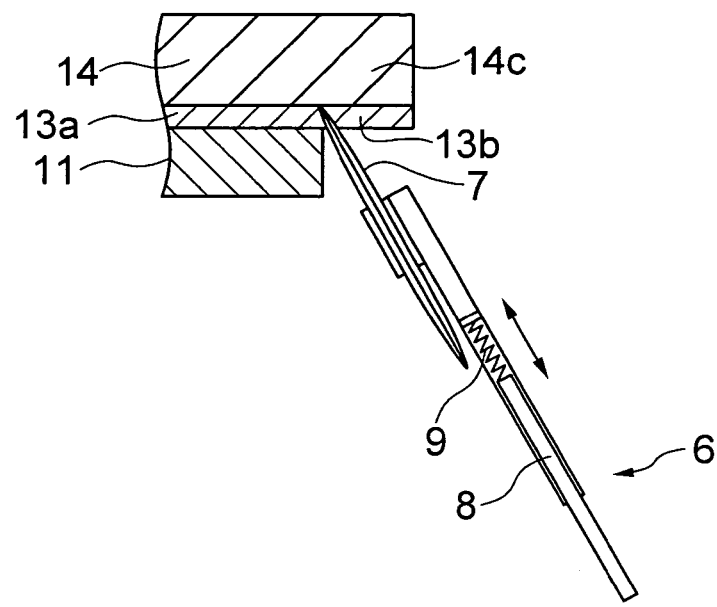
FIG. 5 is an enlarged principal side sectional view showing how the notch forming process in FIG. 2C is obliquely executed by the circle cutter in FIG. 3A.

FIGS. 1A to 1C are side sectional views each showing a process of manufacturing a 2-layered optical disc in a first embodiment. FIGS. 2A to 2E are side sectional views showing processes of manufacturing the 2-layered optical disc, which are executed subsequently to the process in FIG. 1C. FIG. 3A is a front view of a circle cutter capable of executing a notch forming process in FIG. 2C. FIG. 3B is a side view thereof. FIG. 4 is an enlarged principal side sectional view showing how the notch forming process in FIG. 2C is executed by the circle cutter in FIG. 3A. FIG. 5 is an enlarged principal side sectional view showing how the notch forming process in FIG. 2C is obliquely executed by the circle cutter in FIG. 3A.

The first embodiment exemplifies a method of manufacturing a single-sided 2-layered type optical disc. To be specific, as shown in FIG. 1A, a stage 2 for spin coating is so constructed as to be rotated by a motor (unillustrated) through a rotary shaft 1. An elastic deformation retaining member 3 composed of an elastically deformable material for holding a disc-shaped substrate 11, is fixed to a central portion of a top surface of the stage 2. Further, the disc-shaped substrate 11 is formed of a resin material such as PC (Polycarbonate), etc., wherein a recording layer is formed over a recording face 12 provided with a recording/reproducing rugged portion 11a, and the disc-shaped substrate 11 has a central hole 11b.

As shown in FIG. 1A, the elastic deformation retaining member 3 tapered off with its elastic deformation receives insertion of the disc-shaped substrate 11 via the central hole 11b, and is elastically restored in directions of arrowheads in FIG. 1A, whereby the disc-shaped substrate 11 is tightly secured to and retained by the elastic deformation retaining member 3 at the central hole 11b and is thus fixed to the stage 2.

Next, as shown in FIG. 1B, an ultraviolet curing resin 13 is discharged in the vicinity of a boundary between the central hole 11b of the disc-shaped substrate 11 and the elastic deformation retaining member 3 from a nozzle 4 in a way that rotates the stage 2 by the motor (unillustrated) through the rotary shaft 1, thus wetting the vicinity of an inner periphery of the disc-shaped substrate 11 with the ultraviolet curing resin 13.

Subsequently, as shown in FIG. 1c, a translucency stamper 14 including a transfer face 15 formed with a recording/reproducing rugged portion 14a is aligned with the central hole 11b of the disc-shaped substrate 11 and is thus superimposed on the disc-shaped substrate 11 so as to receive insertion of the elastic deformation retaining member 3.

The stamper 14 is composed of an olefin resin that exhibits transmissivity of ultraviolet-rays and has an easy-to-exfoliate property with respect to the ultraviolet curing resin material. An outside diameter of the stamper 14 is slightly larger than the disc-shaped substrate 11, wherein an outer peripheral edge 14c thereof protrudes therefrom. The stamper 14 is disposed so that the transfer face 15 faces the recording face 12 of the disc-shaped substrate 11. Note that the stamper 14 may have the same diameter as the disc-shaped substrate 11 has, however, its diameter is preferably larger than the disc-shaped substrate 11 in order to ensure a gripping area in consideration of the easy-to-exfoliate property.

Next, the stage 2 is rotated at a high speed together with the rotary shaft 1, thereby rotating the disc-shaped substrate 11 and the stamper 14 at the high speed as shown in FIG. 2A. Then, the ultraviolet curing resin 13 is forced to be directed to the outer periphery side with a centrifugal force and is thereby rotated off the outer peripheral edge between the recording face 12 and the transfer face 15, thus effecting the spin coating till a desired layer thickness is obtained.

Next, as shown in FIG. 2B, a top face 14b of the stamper 14 is irradiated with ultraviolet-rays emitted from an ultraviolet light source 5 for a predetermined period of time in a way that rotates the disc-shaped substrate 11 on the stage 2. The irradiation of the ultraviolet rays cures the ultraviolet curing resin 13 interposed between the recording face 12 of the disc-shaped substrate 11 and the transfer face 15 of the stamper 14, thereby forming a spacer layer 13a.

Subsequently, as shown in FIG. 2C, while rotating the stage 2 at a low speed, a rotary blade 7 of the circle cutter 6 in FIG. 3A is pressed against a boundary portion 13b between the protruded outer peripheral edge 14c of the stamper 14 and the spacer layer 13a at a stepped portion of the outer peripheral edge of the disc-shaped substrate 11.

The circle cutter 6 is herein explained. As illustrated in FIGS. 3A and 3B, the circle cutter 6 includes the rotary blade 7 so supported by a rotatable support portion 7a as to be rotatable (auto-rotations) in both of rotational directions in FIG. 3A, and includes a grip member 8 that extends in a radial direction of the rotary blade 7 from the rotatable support portion 7a and can be gripped by a hand. The circle cutter 6 incorporates a spring 9 so that the grip member 8 is extensible and retractable in its longitudinal directions, thereby structuring an extensible/retractable mechanism. The rotary blade 7 is composed of a metallic material, wherein its diameter d is on the order of, e.g., 30 mm. The rotary blade 7 is pressed and thus gets flexibly movable in both of the directions in FIG. 3B under a state-where the spring 9 is compressed.

The circle cutter 6 in FIG. 3A is, as shown in FIG. 4, pressed substantially perpendicularly against the boundary portion 13b of the spacer layer 13a on the underside, as viewed in FIG. 4, of the outer peripheral edge 14c of the stamper 14 in a way that positions the rotary blade 7 along the outer peripheral edge of the disc-shaped substrate 11. The rotary blade 7 is thereby capable of cutting the spacer layer 13a throughout to reach the stamper 14. At this time, since the disc-shaped substrate 11 rotates at the low speed, a notch cut to the stamper 14 can be easily formed for one round in a circumferential direction at the boundary portion 13b of the spacer layer 13a.

As described above, when forming the notch cut to the stamper 14, the grip member 8 gets retractable upon pressing the rotary blade 7 against the spacer layer 13a, and the rotary blade 7 also becomes movable in the extensible/retractable directions. This contrivance enables the rotary blade 7 to follow up with a surface deflection and eccentricity of the disc-shaped substrate 11 and also to surely form the notch.

Moreover, as shown in FIG. 5, the circle cutter 6 is pressed against the boundary portion 13b of the spacer layer 13a so as to obliquely abut thereon in a way that gets the rotary blade 7 apart from the outer peripheral edge of the disc-shaped substrate 11, thereby making it possible to cut the spacer layer 13a throughout to reach the stamper 14 in the oblique direction in FIG. 5. Similarly in FIG. 4, the disc-shaped substrate 11 rotates at the low speed, and hence the notch cut to the stamper 14 can be easily formed for one round in the circumferential direction at the boundary portion 13b of the spacer layer 13a. Further, the rotary blade 7 can follow up with the surface deflection and the eccentricity of the disc-shaped substrate 11 and also can surely form the notch.

As shown in FIG. 4 or FIG. 5, after forming the notch by cutting the spacer layer 13a throughout to reach the stamper, next, as illustrated in FIG. 2D, the stamper 14 is raised upward in FIG. 2D at the vicinity of the outer peripheral edge 14a thereof and is thus exfoliated, while the spacer layer 13a is left on the side of the disc-shaped substrate 11. This exfoliation can be easily executed because of the notch formed in the stamper 14.

With the exfoliation of the stamper 14, as shown in FIG. 3B, the recording face 13c onto which the rugged portion 14a of the transfer face 15 of the stamper 14 is transferred, appears on the surface of the spacer layer 13a.

Subsequently, after forming a recording layer as a second layer on the recording face 13c of the spacer layer 13a, in the same way as described above, the resin material is discharged in the form of droplets along the vicinity of the inner periphery of the spacer layer 13a, and the disc-shaped substrate 11 is rotated at the high speed, whereby a light-transmittable layer 16 is, as shown in FIG. 2E, formed up to a predetermined thickness over the spacer layer 13a by a spin coat method.

As shown in FIG. 2E, the recording face 12 is formed between the disc-shaped substrate 11 and the spacer layer 13a in the manner described above, and another recording face 13c is formed between the spacer layer 13a and the light-transmittable layer 16, whereby the single-sided 2-layered type optical disc can be manufactured.

In manufacturing the optical disc described above, when forming the notch by cutting the spacer layer 13a throughout to reach the stamper 14, as shown in FIG. 4 or FIG. 5, the notch can be surely formed without any accumulation of cutting wastage on a blade edge of the rotary blade 7 by use of the circle cutter 6 in FIG. 3A. Moreover, the circle cutter 6 itself is movable in the longitudinal directions owing to the extensible/retractable mechanism using the spring 9, and is therefore capable of following up with the surface deflection, etc. of the disc-shaped substrate 11 and forming the notch uniformly along the entire periphery. As described above, even in a case where the cutting wastage is produced when forming the notch serving to exfoliate the stamper 14, none of the cutting wastage is left on the disc-shaped substrate 11, and the notch can be surely formed. This enables an occurrence of burrs to be restrained after the exfoliation of the stamper 14, whereby a manufacturing yield can be improved.

Further, as shown in FIG. 5, the outer peripheral edge of the spacer layer 13a is cut in a recessed shape in a way that obliquely abuts the rotary blade 7 thereon, and hence a swelling along the outer periphery can be reduced by dint of effective action on the swelling that is easy to form in the case of forming the light-transmittable layer 16 in FIG. 2E by the spin coat method.

Second Embodiment

A second embodiment exemplifies manufacturing the optical disc in the same processes as those in the first embodiment except that a notch forming method is different from the method in FIG. 2C according to the first embodiment. Therefore, this notch forming method will be explained with reference to FIGS. 6 and 7.

Figure 6:
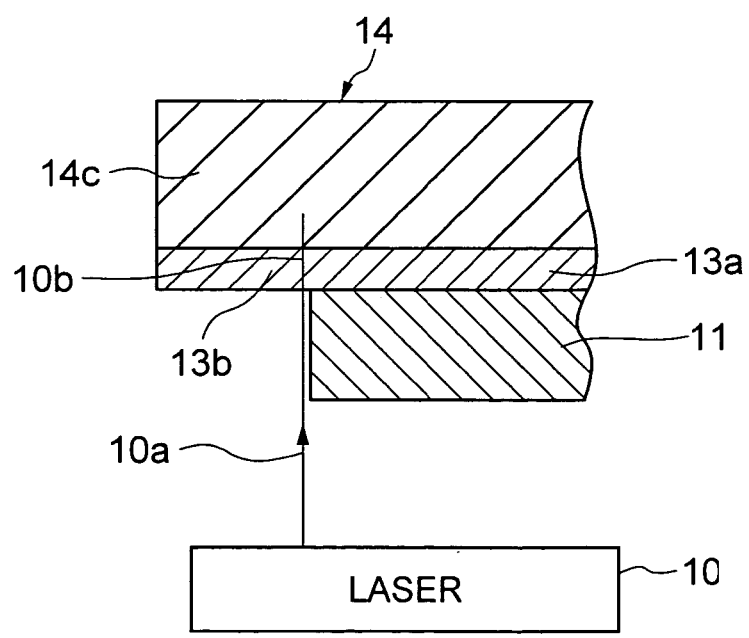
FIG. 6 is an enlarged principal side sectional view showing how the notch forming process in FIG. 2C is executed by irradiation of a laser beam in a second embodiment.
Figure 7:
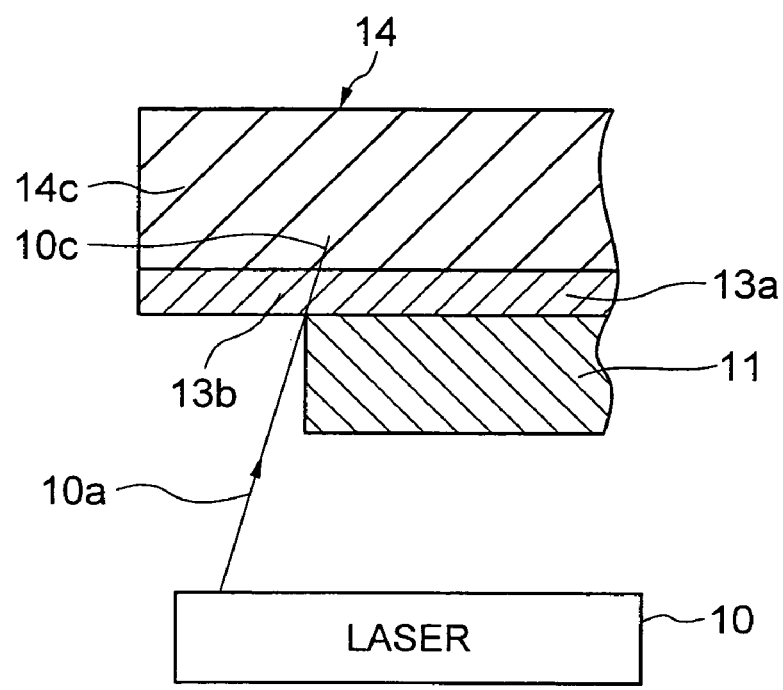
FIG. 7 is an enlarged principal side sectional view showing how the notch forming process in FIG. 2C is obliquely executed by the irradiation of the laser beam in the second embodiment.
Figure 8:
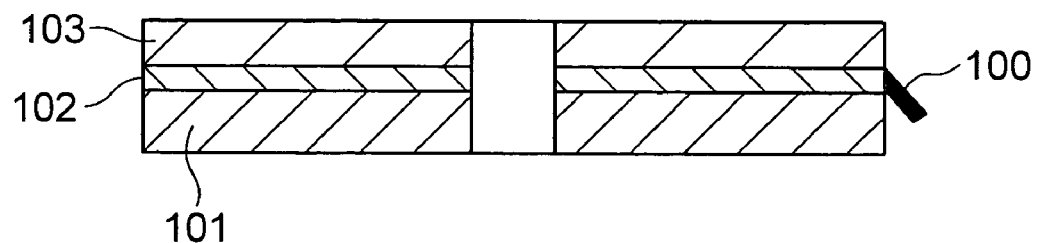
FIG. 8 is an explanatory side sectional view showing the prior art for forming the notch by use of a cutter knife for exfoliating a stamper.

FIG. 6 is an enlarged principal side sectional view showing how the notch forming process in FIG. 2C is executed by irradiation of a laser beam in the second embodiment. FIG. 7 is an enlarged principal side sectional view showing how the notch forming process in FIG. 2C is obliquely executed by the irradiation of the laser beam in the second embodiment.

As shown in FIG. 6, a laser 10 is disposed under the stage 2 in FIGS. 1A and 2A. The boundary portion 13b of the spacer layer 13a under the outer peripheral edge 14c of the stamper 14 is irradiated substantially perpendicularly with a laser beam 10a emitted from the laser 10 along the outer peripheral edge of the disc-shaped substrate 11. The laser beam 10a forms a notch by cutting the spacer 13a throughout to reach the stamper 14, whereby a notch 10b that is almost perpendicular to the spacer layer 13a can be formed. At this time, since the disc-shaped substrate 11 rotates at the low speed, the almost-perpendicular notch 10b can be easily formed for one round in the circumferential direction at the boundary portion 13b of the spacer layer 13a. The almost-perpendicular notch 10b enables the stamper 14 to be easily exfoliated similarly in FIG. 2D.

Further, as shown in FIG. 7, the boundary portion 13b of the spacer layer 13a is obliquely irradiated with the laser beam 10a emitted from the laser 10 in such a way that the beam 10a travels apart from the outer peripheral edge of the disc-shaped substrate 11. The laser beam 10a thus forms the notch by cutting the spacer 13a throughout to reach the stamper 14, whereby a notch 10c inclined to the spacer layer 13a can be formed. At this time, since the disc-shaped substrate 11 rotates at the low speed, the inclined notch 10c can be easily formed for one round in the circumferential direction at the boundary portion 13b of the spacer layer 13a. The inclined notch 10c enables the stamper 14 to be easily exfoliated similarly in FIG. 2D.

A $CO_2$ laser, etc. can be given as the laser 10 in FIGS. 6 and 7, and specifically a $CO_2$ laser marker (ML-G9300) offered by Keyence Corp., etc. can be utilized. This laser maker is employed for marking a lot No., etc. of the optical disc in the process of manufacturing the optical disc and can be diverted to the formations of the notches as shown in FIGS. 6 and 7 simply by changing a laser output. The use of this laser marker neither leads to a rise in costs for equipment nor affects manufacturing costs.

As described above, the boundary portion between the stamper 14 and the disc-shaped substrate 11 is irradiated with the laser beam 10a, thereby making it possible to form the notch without any occurrences of the burrs and the cutting wastage. Further, the notch can be surely formed without being affected by the surface deflection and the eccentricity of the disc-shaped substrate 11. The manufacturing yield of the optical disc can be improved by restraining the burrs from being produced when exfoliating the stamper 14.

Moreover, as shown in FIG. 7, the spacer layer 13a is irradiated obliquely with the laser beam 10a, thereby cutting the outer peripheral edge of the spacer layer 13a in the recessed shape. Therefore, the swelling along the outer periphery can be reduced by dint of effective action on the swelling that is easy to form in the case of forming the light-transmittable layer 16 in FIG. 2E by the spin coat method.

Further, it is preferable that the laser output as a laser condition of the laser 10 on the occasion of forming the notch is equal to or larger than 6 W but equal to or smaller than 26 W. If the laser output is less than 6 W, a depth of the notch becomes insufficient, and it is difficult to effect the exfoliation. Furthermore, if over 27 W, though the exfoliation can be attained with no problem, scorching occurs due to the heat, and the resin is dissolved with the result that the burrs are produced. This is a problem in terms of an external appearance.

Moreover, when the laser output is 6 W through 11 W, the disc-shaped substrate 11 is required to make two or more rotations in order to form the notch that facilitates the exfoliation of the stamper 14. When equal to or higher than 12 W, it is feasible to form such a notch that the stamper 14 can be easily exfoliated by making one rotation of the disc-shaped substrate 11. It is therefore more preferable that the laser output is set equal to or higher than 12 W.

The best mode for carrying out the present invention has been discussed so far, however, the present invention is not limited to this mode and can be modified in a variety of forms within the scope of the technical concept of the invention. For example, the manufacturing methods in the first embodiment and the second embodiment are capable of manufacturing a single-sided 2-layered type DVD and a single-sided 2-layered type Blu-ray Disc capable of recording with a higher density that the DVD. As a matter of course, however, a variety of 3- or more multi-layered optical discs can be manufactured. Furthermore, electron beams, etc. other than the ultraviolet-rays may also be available as energy rays according to the present invention.

What is claimed is:

1. A disc-shaped recording medium manufacturing method of forming a recording layer on a disc-shaped substrate having a central hole, and forming another recording layer on the surface of a spacer layer on said recording layer with said spacer layer interposed therebetween, comprising the steps of:

applying an energy-ray curing resin for forming said spacer layer in the vicinity of said central hole, and thereafter disposing a light-transmittable stamper serving to form said another recording layer so as to cover said disc-shaped substrate;

spreading said energy-ray curing resin over an entire surface of said disc-shaped substrate by rotating said disc-shaped substrate and said stamper;

curing said energy-ray curing resin by irradiating said energy-ray curing resin with energy rays through said light-transmittable stamper, and thus forming said spacer layer;

forming a notch by irradiating an outer peripheral edge of said stamper with a laser beam; and exfoliating said stamper.

2. A disc-shaped recording medium manufacturing method according to claim 1, wherein the irradiation of the laser beam is effected by a laser output within 6 W through 26 W.

3. A disc-shaped recording medium manufacturing method according to claim 1, wherein said stamper is constructed to have an outside diameter larger than said disc-shaped substrate, and said notch is formed in a circumferential direction in a boundary portion between a protruded portion of said stamper and said disc-shaped substrate.

4. A disc-shaped recording medium manufacturing method according to claim 1, wherein said notch is formed while rotating said disc-shaped substrate.

5. A disc-shaped recording medium manufacturing method according to claim 1, wherein an outer peripheral edge of said spacer layer is formed in a recessed shape with an inclination owing to said notch.

* * * * *